Dec. 26, 1933.          D. C. CARVER          1,941,163
                       AUTOMATIC GAS VALVE
                       Filed Oct. 10, 1932
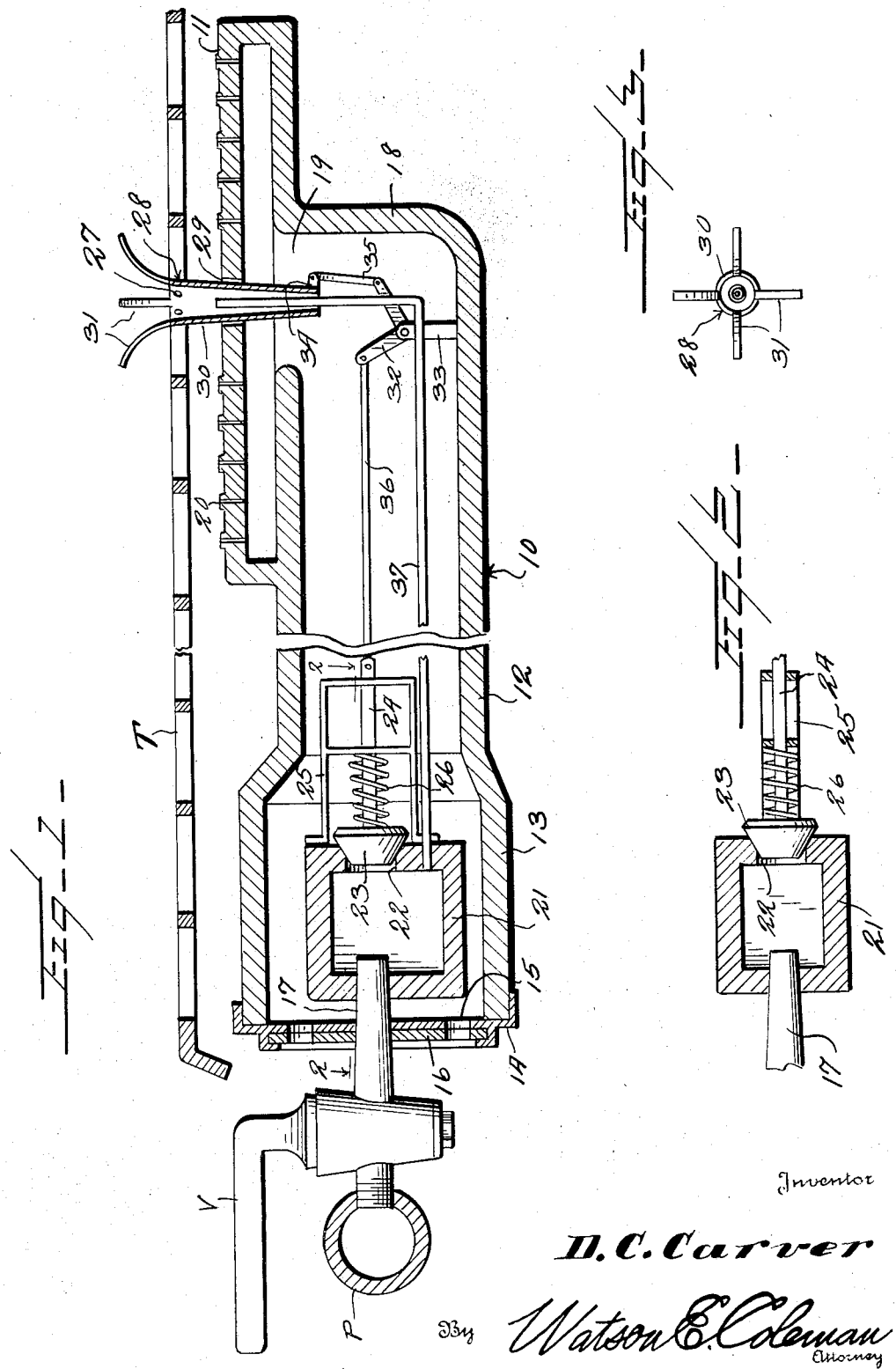

Patented Dec. 26, 1933

1,941,163

UNITED STATES PATENT OFFICE 1,941,163

AUTOMATIC GAS VALVE

Donald C. Carver, Charleston, W. Va.

Application October 10, 1932. Serial No. 637,128

4 Claims. (Cl. 126—52)

This invention relates to gas burners and more particularly to an automatically operated gas valve and burner.

An object of this invention is to provide an automatic safety valve for use with gas or other fuel so that the burner will automatically light when a pan or article is placed on the stove above the burner.

Another object of this invention is to provide an automatically operated valve including a pilot light which is suitably shielded so that it will not be blown out during the time that the burner is inoperative.

A further object of this invention is to provide an automatically operated valve in combination with a manually operated valve so that a predetermined degree of heat can be applied to the particular article placed on the burner.

The above and various other objects and advantages of this invention will in part be described and in part be understood from the following detailed description of the present preferred embodiment, the same being illustrated in the accompanying drawing wherein:—

Figure 1 is a fragmentary enlarged longitudinal section taken substantially through the longitudinal center of a device constructed in accordance with the preferred embodiment of this invention.

Figure 2 is a horizontal section taken on the line 2—2 of Figure 1.

Figure 3 is a detail top plan view of the valve operating member.

Referring to the drawing wherein like numerals of reference designate corresponding parts throughout the several views, the letter P designates generally a pipe which is connected to a source of fuel supply and the letter V indicates a valve structure connected to this pipe P which is of well known construction. This pipe P and valve V are disposed below an open top T of a stove, which is shown in fragmentary form.

In order to provide an automatically operated safety valve structure whereby the fuel discharged through the valve V is automatically cut off as soon as the pan or article is lifted off of the stove T, I have provided a burner structure, generally designated as 10, which is disposed below the top T and connected with the valve V.

This burner 10 comprises a perforated fuel discharge member 11 which is disposed at one end of a tubular member 12, and this tubular member 12 has at the opposite end an enlarged hollow mixing chamber 13. A flanged plate 14 is secured to the inner end of the mixing chamber 13 and is provided with air passages 15 controlled by a slide 16 so that the desired quantity of air can enter the mixing chamber 13 for mixing with gas or other fuel discharged into this mixing chamber 13 by the valve V. The flanged plate 14 engages about the discharge nozzle 17 of the valve V so that the mixing chamber 13 is detachably and concentrically held about the discharge nozzle 17. The tubular mixing member 12 is closed, as at 18, at the outer or burner end thereof, and an outlet port 19 is provided so that the fuel can pass upwardly into the burner 11 and out through the perforations 20 thereof.

In order to provide automatically operated safety means whereby the valve V can be left open but the fuel discharging from the nozzle 17 can be prevented from passing into the mixing chambers 13 and 12, respectively, I have provided a chamber 21 which is disposed about the nozzle 17 within the mixing chamber 13, and is provided at the forward end thereof with an outlet port 22. This chamber 21 is closed on all sides with the exception of the outlet port 22 so that the fuel discharged thereinto by the nozzle 17 which, as shown in Figure 1, projects partly into this chamber, can only be released through the outlet port 22.

A valve 23 is mounted within this outlet port 22 and is disposed on a stem 24 which is slidable in a guide means 25 secured to the chamber 21. A spring 26 is disposed about the stem 24 and constantly urges the valve into closed position.

In order to move the valve 23 into open position when an article in the form of a pan or the like is placed on the top T, I have provided a valve operating member, generally designated as 28, which is slidably disposed through an opening 29 provided in the burner 11. This valve operating member 28 is constructed in the form of a tubular member 30 which is of downwardly tapering construction and provided at the upper end thereof with a plurality of upwardly and outwardly flared pan engaging arms 31 and a plurality of ports 27 below the arms which permit lighting of the burner 11 through the pilot light only when the member 28 is partially lowered.

An L-shaped lever 32 is mounted on an upstanding post or lug 33 carried by the tubular mixing chamber 12 and this L-shaped lever 32 is connected to an outstanding lug 34 carried by the lower end of the tubular member 30 by means of a connecting link 35. This link 35 connects the tubular member 30 to the short leg of the L-shaped member 32 and the other or longer leg is connected by means of an elongated link or connecting bar 36 to the valve stem 24.

In this manner, as the valve operating member 28 moves downwardly, the valve member 23 is moved into open position, thereby permitting the fuel in the chamber 21 to pass into the mixing chambers 13 and 12, respectively, and then outwardly through the burner 11.

A pipe 37 of substantially L-shaped construction has one leg thereof connected to the fuel chamber 21, and the other leg disposed in a vertical position in the tubular member 30. This L-shaped pipe 37 constitutes a pilot pipe line and the fuel is adapted to be constantly discharged through the upper end thereof within the valve operating member 28, so that as soon as the valve operating member 28 is moved downwardly and the valve 23 is moved into open position, the fuel discharging from the burner 11 will be ignited. This tubular member 30 also constitutes a shield disposed about the pilot light with a portion thereof extending above the end of the pilot pipe line so that the pilot light will not be blown out by any draft of air.

In the use and operation of this automatic safety device, the valve operating member 28 is normally held in a position slightly above the top of the stove T, being maintained in this position by the spring 26 which maintains the valve 23 in closed position. Normally, the valve V is turned into open position and may be turned into completely opened position or partly open, as may be desired.

When a pan or other article is placed on top of the stove T and above the burner 11, the article will engage the outwardly flared arms 31 and the valve operating member 28 will then be moved downwardly and the valve 23 is swung into open position by means of the rocking of the L-shaped lever 32. In this position, the fuel in the fuel chamber 21 will pass into the mixing chambers 13 and 12, respectively, and then out through the perforations 20 of the burner 11 and will be ignited by the light constantly maintained on the discharge end of the pilot pipe line 37.

It will be obvious, from the foregoing, that the valve V can be turned into the desired open position so that a predetermined degree of heat can be generated in the burner 11, and this degree of heat can be readily determined so that the articles being heated can be maintained at the desired temperature for cooking or other purposes and when one article has been taken off of the top of the stove T, another article can be placed on top of the burner 11, and this same degree of heat maintained on the second or additional articles.

It is, therefore, obvious that while a manually operated valve V has been disclosed, this valve V can be provided with desired indications so as to show the degree of heat produced in the burner 11.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An automatic safety means comprising the combination with a normally open supply valve and a stove top, of a burner disposed beneath the top, connecting means connecting the burner with the valve, a fuel chamber engaging the valve and disposed within the connecting means, a fuel valve carried by the fuel chamber, a forked hollow valve operating means engaging the valve and extending above the top whereby to move the valve into open position upon engagement by an article placed on the top, a spring for constantly urging said fuel valve into closed position, and pilot means connected to the fuel chamber and extending upwardly into the hollow operating means in a direction toward the burner to ignite the fuel discharged therefrom upon opening of the fuel valve.

2. An automatic safety means comprising a burner, a mixing chamber carried by the burner, a fuel chamber disposed within the mixing chamber, a valve carried by the fuel chamber, a spring constantly urging the valve into closed position, a rock lever, means for mounting the rock lever beneath the burner and within the first named mixing chamber, a connecting link connecting one end of the lever with the valve, a tubular lever rocking means extending upwardly through the burner, a link connecting the lever rocking means with the lever, and means connected to the fuel chamber and extending upwardly through the lever rocking means to constantly maintain a light for igniting the fuel discharged through the burner upon rocking of the fuel valve into open position.

3. An automatic safety means comprising a burner, a fuel chamber connected to the burner, a valve carried by the fuel chamber, a spring constantly urging the valve into closed position, a tapering valve operating member loosely carried by the burner and having an opening vertically therethrough, means connecting the valve with the member, and a pilot pipe line extending through the bottom of the member and substantially closing the opening in the bottom of the member.

4. An automatic safety means comprising a burner, a fuel chamber connected to the burner, a spring pressed valve carried by the chamber and discharging in the direction of the burner, a connecting means connecting the burner with the fuel chamber, an inverted frustro-conical valve operating member extending through the burner, pan engaging arms carried by the operating member, rockable means connecting the member with the valve to move the valve into open position upon depressing of the operating member, and a pilot pipe line connected to the fuel chamber and extending upwardly through the operating member, said pipe line substantially closing the lower end of said operating member.

DONALD C. CARVER.